(12) United States Patent
Eckert

(10) Patent No.: US 8,443,248 B2
(45) Date of Patent: May 14, 2013

(54) METHOD FOR DECODING DATA PACKETS IN A WIRELESS COMMUNICATION SYSTEM

(75) Inventor: Sebastian Eckert, Burgstaedt OT Mohsdorf (DE)

(73) Assignee: Intel Mobile Communications Technology Dresden GmbH, Dresden (DE)

( * ) Notice: Subject to any disclaimer, the term of this patent is extended or adjusted under 35 U.S.C. 154(b) by 342 days.

(21) Appl. No.: 12/963,708

(22) Filed: Dec. 9, 2010

(65) Prior Publication Data

US 2011/0154143 A1   Jun. 23, 2011

(30) Foreign Application Priority Data

Dec. 23, 2009  (EP) .................................... 09180530
Jun. 8, 2010   (EP) .................................... 10165261

(51) Int. Cl.
*G06F 11/00*     (2006.01)
(52) U.S. Cl.
USPC ......................................................... 714/749
(58) Field of Classification Search .................. None
See application file for complete search history.

(56) References Cited

U.S. PATENT DOCUMENTS 8,291,279 B2 * 10/2012 Sharon et al. ................. 714/752
2005/0138530 A1   6/2005 Huang et al.
2011/0179332 A1 * 7/2011 Ryden et al. .................. 714/751
2011/0276852 A1 * 11/2011 Mueller-Weinfurtner et al. ............................. 714/749
2012/0072800 A1 * 3/2012 Harel ............................ 714/751

FOREIGN PATENT DOCUMENTS

EP    1 389 847 A1    2/2004
WO    2004 062184 A1  7/2004

OTHER PUBLICATIONS

European Search Report of corresponding EP application No. 10165261.8-1237 dated Mar. 1, 2012.

* cited by examiner

*Primary Examiner* — Michael Maskulinski
(74) *Attorney, Agent, or Firm* — SpryIP, LLC

(57) ABSTRACT

A method is provided for decoding data packets in wireless communication schemes that use a Hybrid Automatic Repeat Request technique, and a receiver for wireless communication that performs such a method. The HARQ memory incorporated in a receiver for wireless communication is minimized to a size which only reserves memory for an average number of erroneous sub-packets. Following decoding, an error check is performed on a per sub-packet basis, and only the softbits of those sub-packets for which decoding errors have been detected are stored in the HARQ memory. Correctly decoded sub-packets are stored in a separate memory. This significantly decreases the size of the HARQ memory required at the receiver which is beneficial in terms of both silicon area and power consumption.

7 Claims, 6 Drawing Sheets

METHOD FOR DECODING DATA PACKETS IN A WIRELESS COMMUNICATION SYSTEM

CROSS REFERENCE TO RELATED APPLICATIONS

This application claims priority of European Patent Application No. 09180530.9 filed on Dec. 23, 2009, and European Patent Application No. 10165261.8 filed on Jun. 8, 2010, the entire disclosure of these applications being hereby incorporated herein by reference.

FIELD OF THE INVENTION

The invention relates to a method for decoding data packets in wireless communication schemes that use a Hybrid Automatic Repeat Request technique, and also relates to a receiver for wireless communication that performs such a method.

BACKGROUND OF THE INVENTION

In wireless communication systems employing LTE or WiMax, Hybrid Automatic Repeat Request (Hybrid ARQ, or brief HARQ) is applied to sustain link quality between transmitter and receiver even under bad channel conditions.

In Hybrid ARQ systems, in case the receiver detects an erroneous reception of a data packet or a decoding error, e.g. by evaluating a cyclic redundancy check (CRC) sum, it indicates this to the transmitter by returning a negative acknowledgement (NACK) message. In this case, the transmitter encodes and modulates the same data packet again and repeats the previous transmission. The receiver demodulates the repeated data packet, combines the newly computed softbits with the softbits from the previous transmission, and starts another decoding attempt. In this way, the probability of erroneous decoding at the receiver is decreased. This interaction of feedback and retransmission can be repeated multiple times, which increases link robustness between transmitter and receiver.

To this end, however, a memory (HARQ memory) is required at the receiver, in order to store the received signal to be combined with the retransmitted signal at a later time. In particular, the received signal is stored after softbit computation. The receiver always has to store the softbits of a complete data packet in the HARQ memory, the HARQ memory's size thereby being determined by the maximum length of the encoded data packet. In LTE which uses multi-antenna arrangements at the transmitter and/or receiver, multiple HARQ processes that include information feedback and retransmission are running in parallel. Since the receiver has to provide memory for every HARQ process, the total HARQ memory size required is increased significantly.

For wireless communication systems that apply the Hybrid ARQ protocol, the HARQ memory is one of the dominant contributors to die size and power consumption. In other words, the HARQ memory size defined for LTE is very significant for embedded receiver designs in terms of both, silicon area and power consumption. In LTE, different receiver categories have been defined which require HARQ memory sizes for up to 3,667,200 softbits.

Therefore, it is very much desirable to shrink the HARQ memory size. Any reduction of the HARQ memory size is desirable for a chipset vendor in order to gain competitiveness.

SUMMARY OF THE INVENTION

The invention provides a method for decoding data packets in a wireless communication system that uses a Hybrid Automatic Repeat Request (HARQ) technique. The method comprises the steps of providing a HARQ memory in a receiver; receiving softbits of each of a plurality of demodulated sub-packets of a received data packet; storing the softbits of said demodulated sub-packets in said HARQ memory; receiving softbits of each of a plurality of retransmitted demodulated sub-packets of a retransmitted data packet; combining the softbits of a sub-packet from an initially transmitted data packet with the softbits of the respective sub-packet from a retransmitted data packet. In contrary to the conventional standard requirements, the size $M_p$ of the HARQ memory according to the invention is defined by $M_p = (1-(1-p_{tp})^{-N_{cb}}) \cdot N_{cb} \cdot L_{cb}$, where $p_{tp}$ is the probability of data packet errors, $N_{cb}$ is the number of sub-packets per data packet, and $L_{cb}$ is the maximum length of a sub-packet. The inventive method further comprises, prior to the storing step, the step of performing an error check on each sub-packet which can be a cyclic redundancy check (CRC) in one embodiment. The storing step comprises storing, in said HARQ memory, only softbits of those demodulated sub-packets of a received data packet which failed the error check, and the method further comprises storing decoded data bits of those demodulated sub-packets of a received data packet that have passed the error check, in a second memory.

By storing in the HARQ memory only softbits for those sub-packets, for which decoding errors have been detected, the size of the HARQ memory required at the receiver can be significantly reduced. While prior art HARQ processing and decoding algorithms always store the softbits for all sub-packets in the HARQ memory, the invention allows a significant reduction of the HARQ memory size since softbits of sub-packets without decoding errors are not stored in the HARQ memory. Rather, the decoded sub-packet is stored in a separate memory. Since encoding involves a multiplication of the bits to be processed, the factor of which is given by the code rate, it will be understood that storing a decoded sub-packet requires far less memory space than storing the demodulated softbits of the same sub-packet. To give an example, with a 4 bit resolution for demodulation to softbits and a code rate of one third introduced by a turbo encoding technique, which are common figures in LTE SISO, a memory smaller by a factor of 12 is required for storing the decoded bits of a sub-packet instead of the softbits.

The method further comprises combining the softbits of each sub-packet stored in said HARQ memory with the softbits of a respective sub-packet from a retransmitted data packet. So, in case of retransmission of an entire packet, newly received softbits are combined with those stored in HARQ memory only for the sub-packets that had decoding errors detected during initial transmission.

The combining step can comprise an addition of the respective softbits of a sub-packet from a first transmission of a data packet with the softbits of a sub-packet from a retransmission of the same data packet, with applying a weighting in function of a signal-to-noise ratio (SNR) of the transmission and the retransmission. So the softbits from a transmission exhibiting a better SNR can be given a stronger weight than the softbits from a transmission with a poorer channel quality.

The invention makes use of the fact, that the longest data packets which require the largest HARQ memory size can be decoded as individual sub-packets including individual CRC based detection of decoding errors. The method of the invention takes advantage of the individual error detection on a sub-packet basis.

In another aspect, the invention provides a receiver for wireless communication comprising a decoder which employs a Hybrid Automatic Repeat Request (HARQ) technique for decoding data packets and which is adapted to perform the inventive decoding method described above.

BRIEF DESCRIPTION OF THE DRAWING FIGURES

Additional features and advantages of the present invention will be apparent from the following detailed description of specific embodiments which is given by way of example only and in which reference will be made to the accompanying drawings, wherein.

Figure 6:
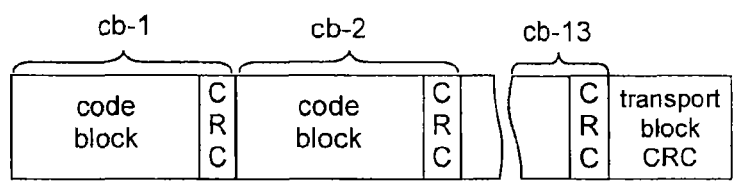
Figure 7:
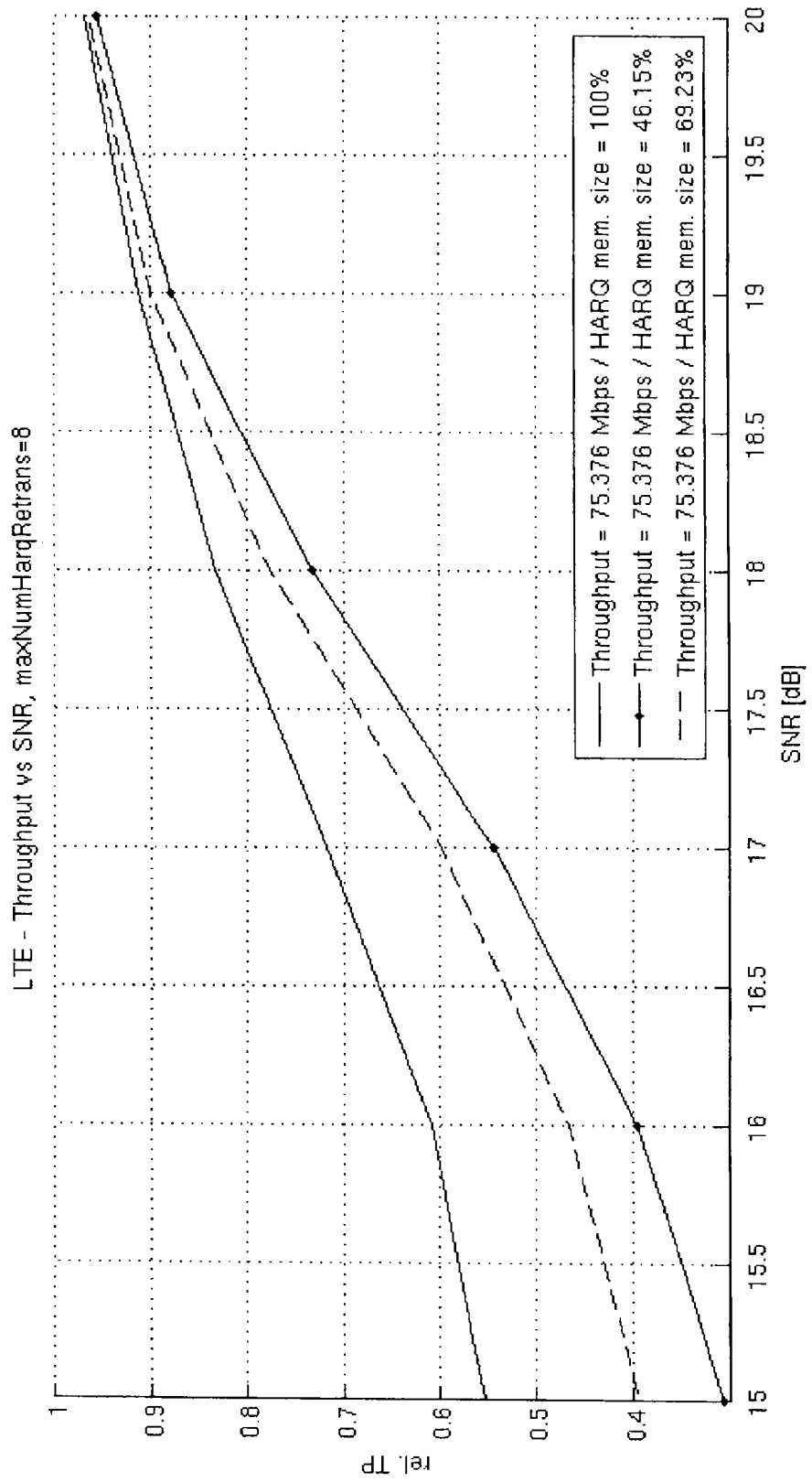

FIG. 6 schematically illustrates a transport block according to the LTE standard; and FIG. 7 is a graph illustrating the trade-off of HARQ memory reduction according to the invention versus link robustness.

DETAILED DESCRIPTION

Figure 1:
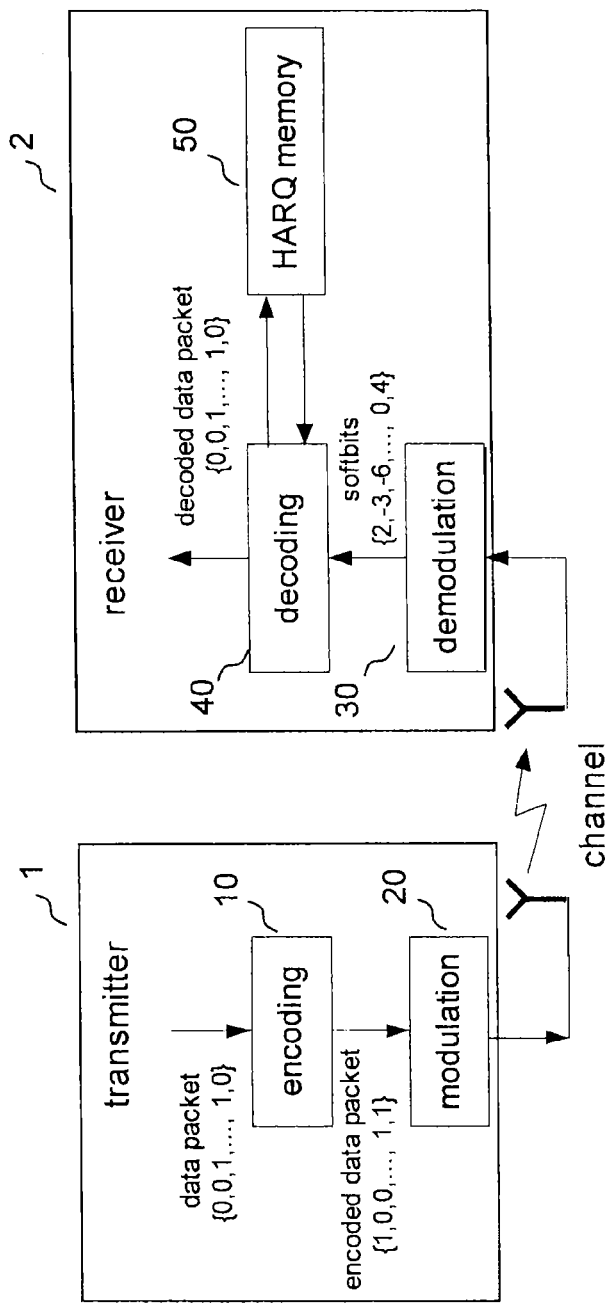
FIG. 1 shows a model of a communication system in which the invention can be employed.

FIG. 1 shows a model of a communication system in which the invention can be employed as comprising a transmitter 1 and a receiver 2 which are connected through a radio channel. In transmitter 1 subsequent data packets comprised of individual data bits are encoded (at 10) by some known encoding technique. As is known in the art, any of this encoding technique causes a multiplication of the bits of each packet, for example, turbo coding in LTE implies a tripling of the bit number. The encoded data packets are then modulated (at 20) by any known modulation scheme, and the modulated bit stream is fed to an antenna for transmission.

At the receiver's side the received bit stream is demodulated (at 30), and the receiver computes softbits for each received and demodulated bit (log-likelihood ratios), which represent a reliability measure for the received data packet. The sign of a softbit correspond to the likelihood of a demodulated bit being 0 or 1. The magnitude of a softbit is a measure for the reliability of the respective sign information (in a range of +/−7 which corresponds to a resolution of 4 bits). The softbits are now decoded (at 40) and the decoded data packets are checked for decoding errors, e.g. by evaluating a cyclic redundancy check (CRC) sum.

In communication schemes that use Hybrid Automatic Repeat Request (HARQ) to sustain link quality between transmitter and receiver even under bad channel conditions, a HARQ memory (50) resides at the receiver and stores the softbits of a received data packet. In case the receiver could not decode the data packet without decoding error, it indicates this to the transmitter by returning a negative acknowledgement (NACK) message. In this case, the transmitter encodes and modulates the same data packet again and repeats the previous transmission. The receiver can now combine the newly received softbits with those stored in HARQ memory 50 and start a new decoding attempt, for which the probability of decoding errors is decreased.

Figure 2:
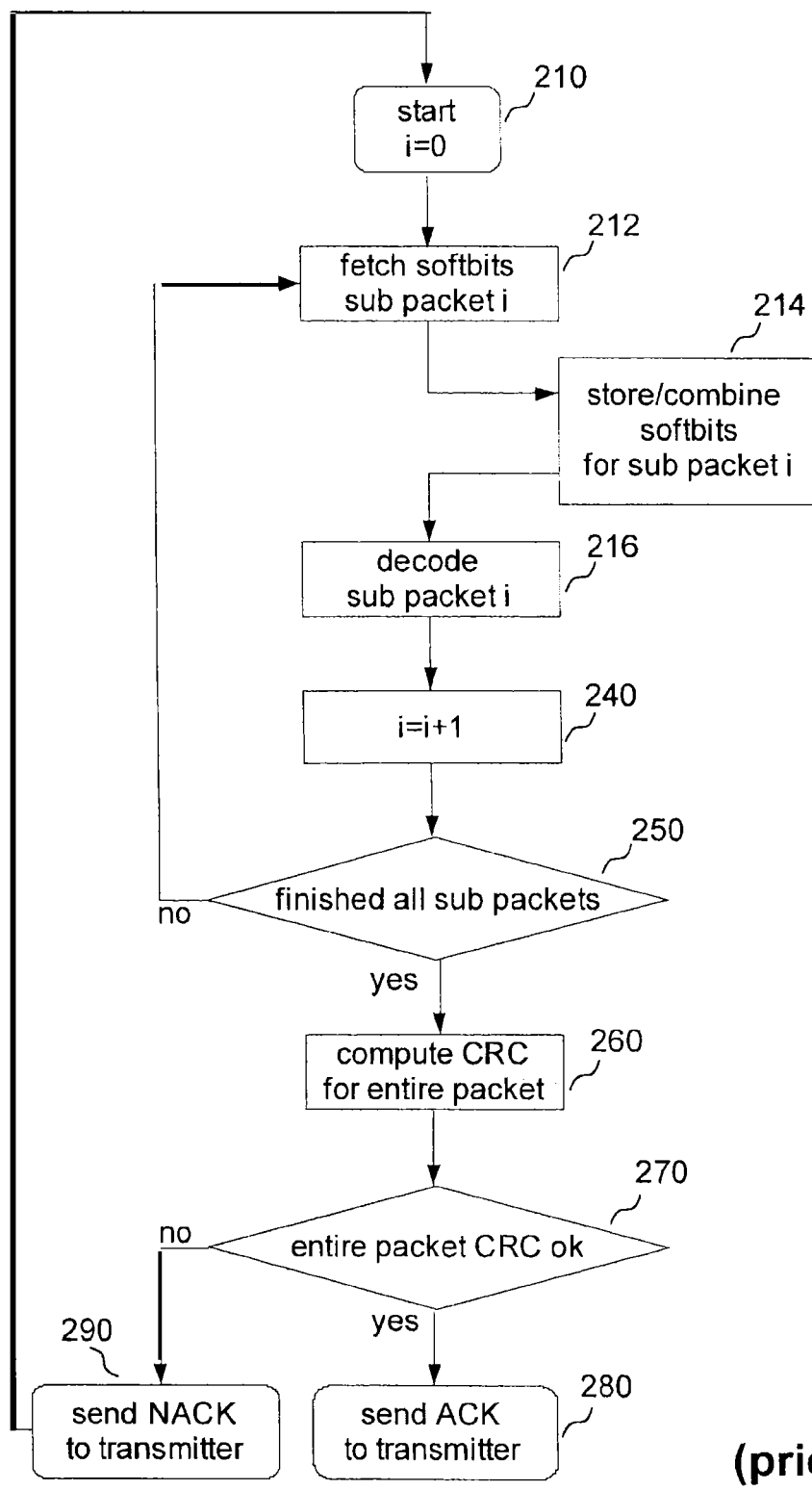
FIG. 2 shows a flow chart of a prior art HARQ processing and decoding algorithm.

FIG. 2 shows a flow chart of a prior art HARQ processing and decoding algorithm for sub-packets which is particularly applied for the Long Term Evolution (LTE) mobile communication standard where the data packets are referred to as transport blocks and the sub-packets are referred to as code-blocks. In a first pass, the received softbits for all sub-packets of a demodulated packet are stored (214) in a HARQ memory which is dimensioned according to the maximum size of a transmitted data packet. In step 216 the current sub-packet is decoded, and in step 240 the sub-packet number is incremented and loop 212 to 240 is performed for each sub-packet, e.g. for i=0 to 12. Once all sub-packets have been decoded individually ("yes" in decision block 250), the CRC check sum is calculated over the entire packet, in step 260. That is why a single error in one sub-packet (code-block) may cause a decoding error of an entire packet (transport block). If the CRC of the entire packet is correct ("yes" in decision block 270), the receiver returns an ACK message (positive acknowledgement) to the transmitter in step 280, otherwise a NACK message (negative acknowledgement) is sent, in step 290. In case of a NACK message, control is returned to block 210 to repeat the retrieving step 212 for each sub-packets i received in a retransmission operation. In step 214, the softbits of each retransmitted sub-packet are combined with the softbits received in the first transmission. This combination comprises calculation of a weighted sum of the softbits, with a stronger weight attributed the softbits from a transmission exhibiting a better SNR (signal-to-noise ratio) than that from a transmission exhibiting a poorer SNR. The combined softbits are stored in the HARQ memory (such as 50 in FIG. 1), and steps 216 to 270 are repeated for these combined softbits.

Figure 3:
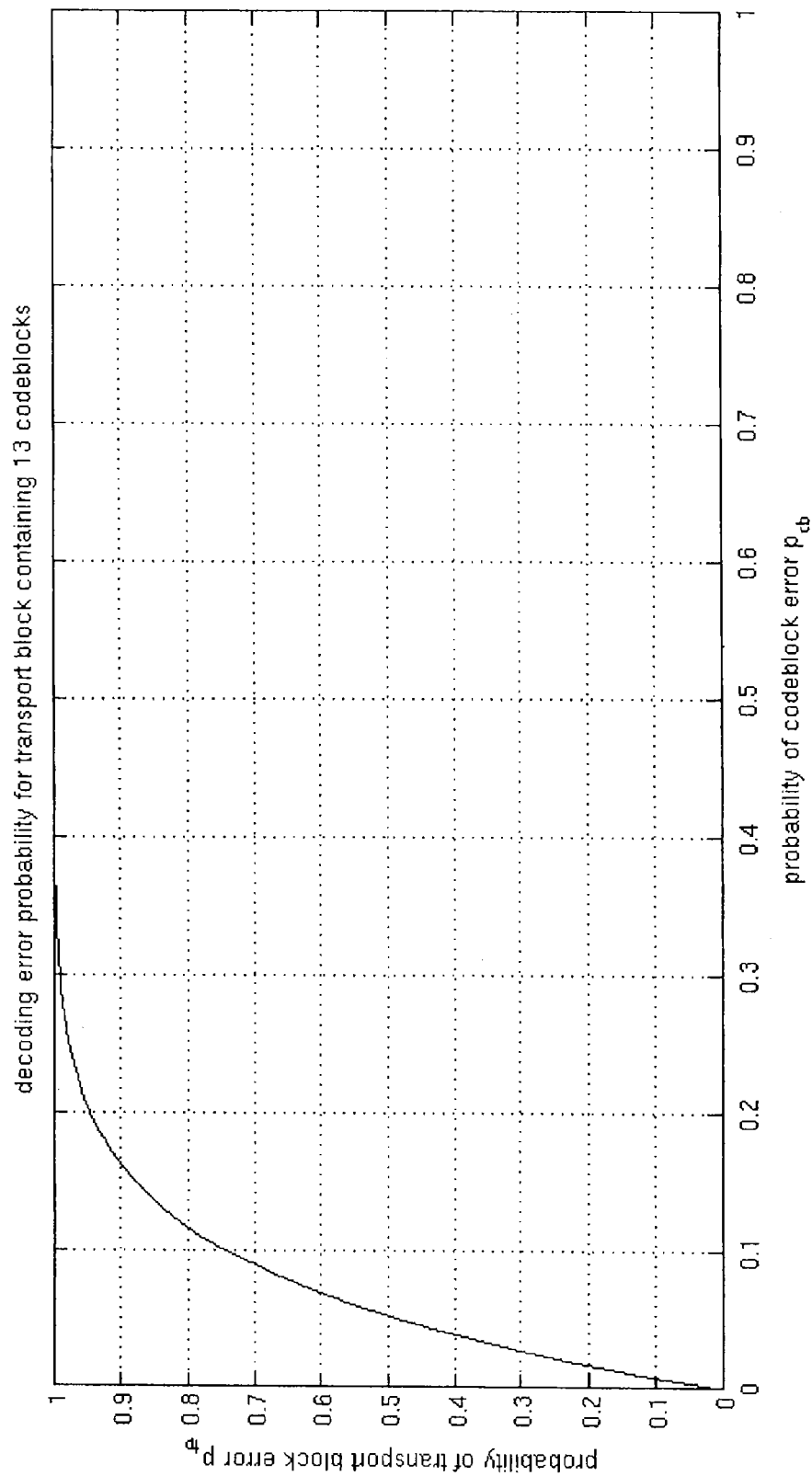
FIG. 3 is a graph of decoding error probabilities in a decoder of FIG. 1.

It has now been realized by the inventors that even for very high probabilities of packet errors, i.e. transport block errors $p_{tp}$, the probability of sub-packet errors, i.e. code-block errors, remains quite low. FIG. 3 shows a graph of decoding error probabilities for transport block and code-blocks for a number of code-blocks $N_{cb}$ of 13. As can be seen from FIG. 3, in an operation range exhibiting a transport block error probability $p_{tp}$ from 0.3 to 0.7 which is relevant in practice, the probability for code-block errors is less than 10%.

Assuming, that the probability for decoding errors is identical for all sub-packets (code-blocks in LTE terminology) and denoting this probability by $p_{cb}$, the probability of a decoding error for the entire packet (transport block in LTE terminology) is given by:

$$p_{tp}=1-(1-p_{cb})^{N_{cb}} \qquad (1)$$

In the above equation the number of sub-packets per packet is denoted by $N_{cb}$.

Though the invention is described in detail with LTE terminology, is has to be appreciated, however, that the invention can also be employed with other communication schemes which provide error check means per sub-packet.

FIG. 6 illustrates an example of a data packet, referred to as transport block in LTE terminology, as comprising a number $N_{cb}$ of 13 code-blocks with an CRC block at the end of each code block, and a transport block CRC at the end of the packet. The code block CRCs are intended by the standard to support early termination decoding which implies termination of a decoding operation once an error has been detected in a code block. The transport block CRC is provided to support data packet error check, such as e.g. at 260 in FIG. 2.

The invention is based on the realization that notwithstanding decoding of an entire packet fails, a majority of sub-packets have been decoded error-free. According to the invention, the HARQ memory incorporated in a receiver for wireless communication is minimized to a size which only reserves memory for an average amount of erroneous sub-packets.

According to this general idea, the required HARQ memory size per HARQ process $M_p$ is found statistically by:

$$M_p = p_{cb} \cdot N_{cb} \cdot L_{cb} \qquad (2)$$

$$M_p = (1-(1-p_{tp})^{-N_{cb}}) \cdot N_{cb} \cdot L_{cb} \qquad (3)$$

wherein $L_{cb}$ is the maximum length of a code block, and wherein $p_{tp}$ will be in the operation range which is typically defined by quality-of-service (QoS) agreements between user and communication provider.

Figure 4:
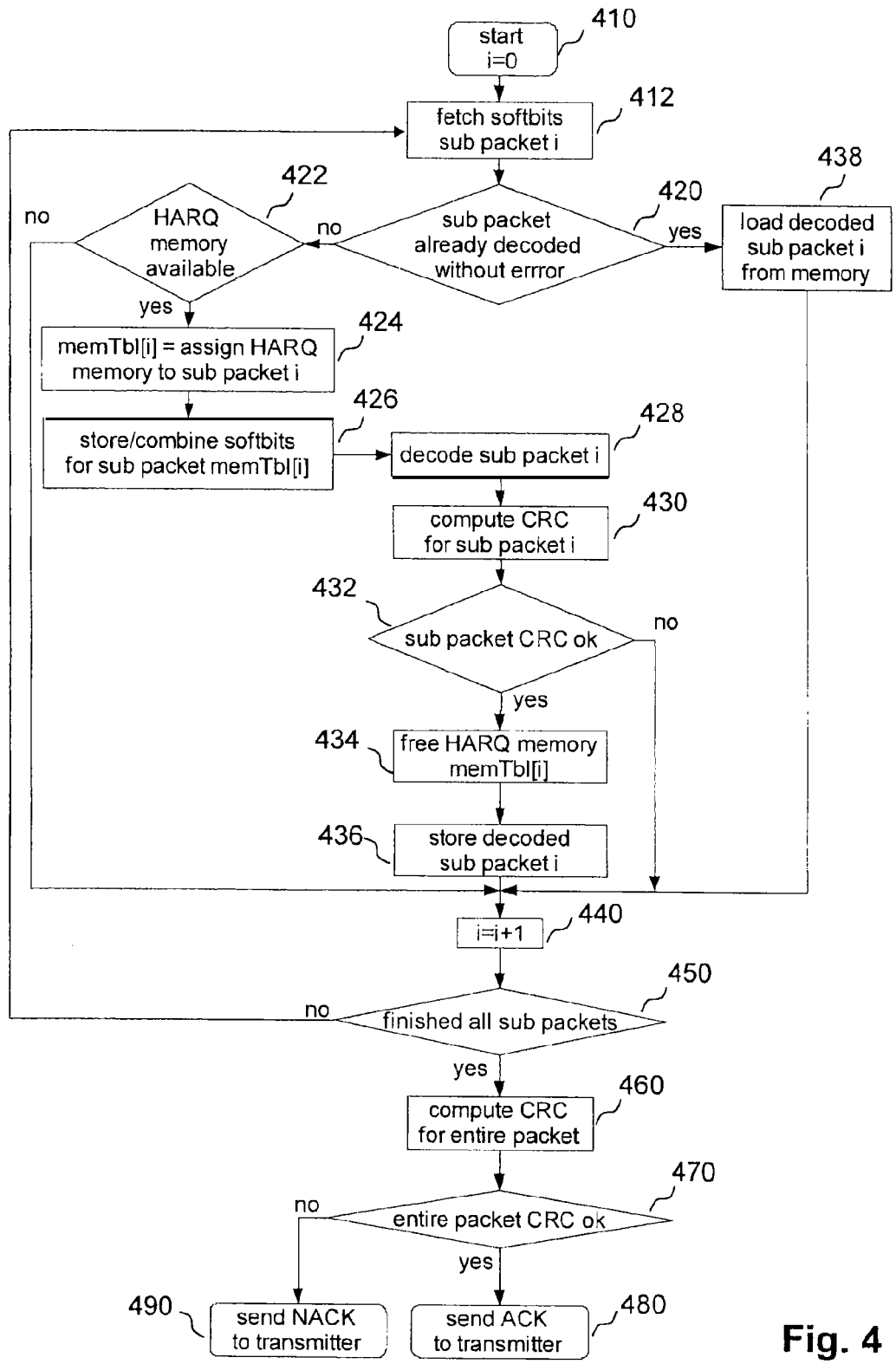
FIG. 4 shows a flow chart of a HARQ processing and decoding algorithm according to the invention.
Figure 5:
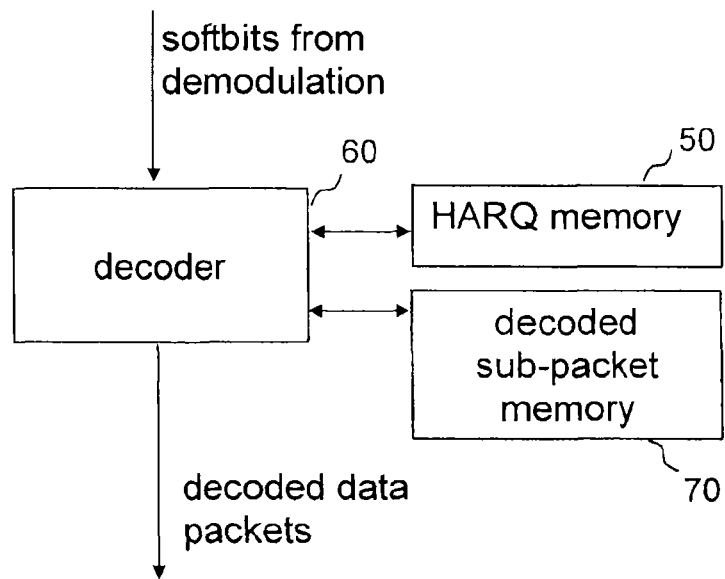
FIG. 5 is a block diagram of a portion of a receiver according to the invention.

FIG. 4 shows a flow chart of a HARQ processing and decoding algorithm according to the invention, and FIG. 5 shows a block diagram of a portion of a receiver including a decoder 60 which is adapted to perform the combining and channel decoding tasks of FIG. 4. For every sub-packet i, the decoder first checks whether the sub-packet has already been decoded successfully, in decision block 420. If the answer is "yes", the decoded sub-packet is loaded from a separate memory 70 which is provided in the receiver of the invention to store successfully decoded sub-packets, as illustrated in step 438. Otherwise, the decoder tries to combine the respective softbits with softbits from previous transmissions and to store them in HARQ memory 50, as indicated in block 426.

Since the size of the HARQ memory according to the invention is reduced and is possibly smaller than required, the decoder, prior to this combining and storing operation, tries to allocate HARQ memory. HARQ memory allocation for the current sub-packet i is stored in a look-up table, e.g. the array-variable memTb1[i], as shown at 424 in FIG. 4.

In case sufficient HARQ memory is not available ("no" in decision block 422), the decoder cannot decode the current sub-packet i. Otherwise, the sub-packet is decoded, in step 428, and is CRC checked for decoding errors, in step 430.

If no decoding errors occurred, which is detected in block 432, the allocated HARQ memory is set free, in block 434, so that memTb1[i] of the HARQ memory can be reused for subsequent sub-packets. In fact, a dynamic memory allocation is implemented by blocks 424 and 434 of FIG. 4. Subsequently, in block 436, the receiver stores the decoded sub-packet in dedicated sub-packet memory 70.

In case the sub-packet CRC check failed ("no" in decision block 432) and a decoding error has been detected, the decoder continues with the next sub-packet, as indicated in step 440.

Steps 412 to 440 are repeated until all sub-packets have been decoded successfully.

Once the entire packet has been decoded, which is determined in decision block 450, the decoder computes a packet CRC, in step 460. If the CRC check sum of the entire packet is correct which is determined in block 470, the receiver sends back an ACK message (positive acknowledgement) to the transmitter, at 480, otherwise (490) a NACK message (negative acknowledgement) is sent.

When comparing the disclosed method shown in FIG. 4 with the state of the art shown in FIG. 2, it can be seen that the disclosed method leads to a slightly higher retransmission rate. If the HARQ memory size is reduced, as proposed by the invention, it might happen that for certain sub-packets the receiver cannot allocate enough HARQ memory, which means that no decoding attempt occurs. By definition this circumstance increases the probability for retransmitting the entire packet and thus decreases link quality between transmitter and receiver.

Therefore, the disclosed method requires a trade-off between memory reduction and link robustness.

The size of a conventional HARQ memory is given by the maximum packet length of a communication system. Therefore, shrinking the HARQ memory size can only affect the transmission of long packets, which corresponds to high-throughput transmission scenarios only. It has been shown analytically and proved by simulations that the impact on system performance in terms of throughput vs. signal-to-noise ratio is very limited, even when the HARQ memory size is shrinked significantly.

FIG. 7 is a graph illustrating the trade-off of HARQ memory reduction according to the invention versus link robustness. The throughput results illustrated were obtained by simulations for LTE with the highest data rate of 75.4 Mbps per transport block, which corresponds to the maximum data packet length of 75.4 Mbits. The diagram shows that even when the HARQ memory is reduced to less than 50%, the maximum throughput can be achieved at the same signal-to-noise ratio of 20 dB. Around 70% of the throughput can be achieved within around 1 dB higher signal-to-noise ratio.

The disclosed method exhibits the highest decrease in link robustness in cases of high throughput scenarios and low signal-to-noise ratio (SNR), which correlates with a high retransmission rate. Only with these scenarios the inventive receiver cannot allocate enough HARQ memory for all sub-packets, as shown at decision block 422 in FIG. 4.

However, these scenarios are very unlikely to occur in a multi-user cellular network. Link adaptation schemes prevent the transmitter from increasing the retransmission rate for high throughput transmissions. Instead of retransmitting the entire packet with the same high throughput over and over again, the transmitter will adapt coding and modulation schemes for the retransmissions in order to lower the throughput and to increase the error free decoding probability at the receiver.

Therefore, only high throughput scenarios with a relative throughput of more than 70% shall be assessed for the tradeoff between HARQ memory size and link robustness.

The invention claimed is:

1. A method for decoding data packets in a wireless communication system that uses a Hybrid Automatic Repeat Request (HARQ) technique, the method comprising the steps of:

providing a HARQ memory in a receiver;
receiving softbits of each of a plurality of demodulated sub-packets of a received data packet;
storing the softbits of said demodulated sub-packets in said HARQ memory;
receiving softbits of each of a plurality of retransmitted demodulated sub-packets of a retransmitted data packet;
combining the softbits of a sub-packet from an initially transmitted data packet with the softbits of the respective sub-packet from a retransmitted data packet; wherein the size of the HARQ memory is defined according to $M_p = (1-(1-p_{tp})^{-N_{cb}}) \cdot N_{cb} \cdot L_{cb}$, where $p_{tp}$ is the probability of data packet errors, $N_{cb}$ is the number of sub-packets per data packet, and $L_{cb}$ is the maximum length of a sub-packet; and the method further comprising:

prior to the storing step, performing an error check on each sub-packet; and
the storing step comprises:
storing, in said HARQ memory, only softbits of those demodulated sub-packets of a received data packet which failed the error check;
the method further comprising:
for those demodulated sub-packets of a received data packet that have passed said error check, storing decoded data bits in a second memory.

2. The method of claim 1, further comprising combining the softbits of each sub-packet stored in said HARQ memory with the softbits of a respective sub-packet from a retransmitted data packet.

3. The method of claim 1, wherein said error check is a cyclic redundancy check (CRC).

4. The method according to claim 1, wherein the combining step comprises addition of the respective softbits of a sub-packet from a first transmission of a data packet with the softbits of a sub-packet from a retransmission of the same data packet, with a weighting in function of a signal-to-noise ratio of a transmission and a retransmission channel.

5. A receiver for wireless communication comprising at least a demodulator and a decoder which employs a Hybrid Automatic Repeat Request (HARQ) technique for decoding data packets, and a HARQ memory, wherein said decoder is operative to:
receive softbits of each of a plurality of demodulated sub-packets of a transmitted data packet;
store the softbits of said demodulated sub-packets in said HARQ memory;
receive softbits of each of a plurality of retransmitted demodulated sub-packets of a retransmitted data packet;
combine the softbits of a sub-packet from an initially transmitted data packet with the softbits of the respective sub-packet from a retransmitted data packet;

the HARQ memory has a size of $M_p = (1-(1-p_{tp})^{-N_{cb}}) \cdot N_{cb} \cdot L_{cb}$, where $p_{tp}$ is the probability of data packet errors, $N_{cb}$ is the number of sub-packets per data packet, and $L_{cb}$, is the maximum length of a sub-packet; and
the receiver further comprises a second memory for decoded data bits; and
the decoder is further operative to perform an error check on each sub-packet prior to softbit storing;
store, in said HARQ memory, only the softbits of those demodulated sub-packets of a received data packet which failed the error check; and
for those demodulated sub-packets of a received data packet that have passed said error check, store decoded data bits in said second memory.

6. The receiver of claim 5 wherein the decoder is further operative to combine the softbits of each sub-packet stored in said HARQ memory with the softbits of a respective sub-packet from a retransmitted data packet.

7. The receiver of claim 5, wherein the combination of sub-packet softbits comprises addition of the respective softbits of a sub-packet from a first transmission of a data packet with the softbits of a sub-packet from a retransmission of the same data packet, with a weighting in function of a signal-to-noise ratio of a transmission and a retransmission channel.

* * * * *